No. 621,456.  Patented Mar. 21, 1899.
R. W. JAMIESON.
NUT LOCK.
(Application filed June 28, 1898.)

(No Model.)

WITNESSES
Wm. D. McJennett
F. A. Stewart

INVENTOR
Richard W. Jamieson
BY
Edgar Tate & Co
ATTORNEYS

UNITED STATES PATENT OFFICE.

RICHARD WILLIAM JAMIESON, OF ROANOKE, INDIANA.

NUT-LOCK.

SPECIFICATION forming part of Letters Patent No. 621,456, dated March 21, 1899.

Application filed June 28, 1898. Serial No. 684,654. (No model.)

*To all whom it may concern:*

Be it known that I, RICHARD WILLIAM JAMIESON, a citizen of the United States, residing at Roanoke, in the county of Huntington and State of Indiana, have invented certain new and useful Improvements in Nut-Locks, of which the following is a full and complete specification, such as will enable those skilled in the art to which it appertains to make and use the same.

This invention relates to nut-locks; and the object thereof is to provide an improved device of this class which is simple in construction and also comparatively inexpensive and which is particularly adapted for use in forming connections or couplings for railway-rails, but which may be employed wherever devices of this class are required.

The invention is fully disclosed in the following specification, of which the accompanying drawings form a part, in which—

Figure 1:
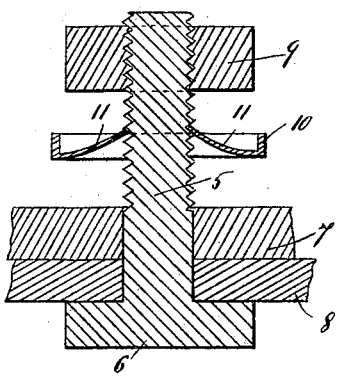
Figure 2:
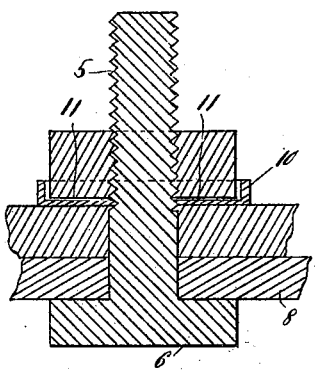
Figure 3:
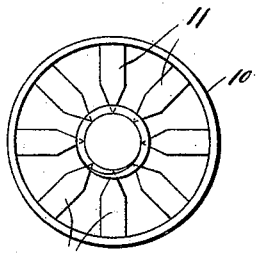

Figure 1 is a sectional side view showing my improved nut-lock before the nut is screwed home. Fig. 2 is a similar view showing the nut screwed home; Fig. 3, a plan view of the lock which I employ; and Fig. 4, an end view of the device as shown in Fig. 2 and showing additional means to prevent the nut from coming off.

In the drawings forming part of this specification the separate parts of my improvement are designated by the same numerals of reference in each of the views, and in said drawings I have shown a screw-threaded bolt 5, provided with a head 6, and I have also shown at 7 a part which represents the central web of a railway-rail and at 8 a fish-plate. The parts 7 and 8 may represent, however, any desired article or articles or any desired pieces or parts of machinery through which a bolt is passed, and I have also shown an ordinary nut 9, which is adapted to be screwed onto the bolt 5, and in the practice of my invention I provide a lock for the nut, which consists of an annular ring or band 10, having inwardly-directed radial spring-arms 11, any desired number of which may be employed. These spring-arms are preferably quite close together and are curved outwardly in the direction of the end of the bolt when the lock is placed on the bolt and in the direction of the nut, and said spring-arms are provided with sharp cutting-points at their inner ends.

The length of the spring-arms 11 is such that the points at the inner ends thereof are arranged in a circle the diameter of which is less than the greatest diameter of the bolt 5; but the said lock may be placed on the bolt by forcing the bolt through the central circular opening between the inner ends of said spring-arms, and in this operation the said spring-arms are projected outwardly, as shown in Fig. 1.

The diameter of the ring or band 10 is greater than that of the nut 9, and when the nut 9 is screwed home, as shown in Fig. 2, the spring-arms will be forced inwardly against the plate or part 7, as is also shown in Fig. 2, and in this operation the pointed ends of said spring-arms will cut through the threads of the bolt, and the friction occasioned by the nut and the said spring-arms 11 of the nut-lock will prevent the lock from turning and also securely holding the nut in place and prevent it from turning on the bolt 5.

Figure 4:
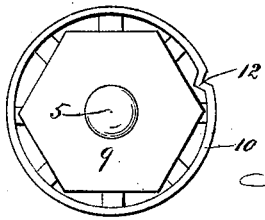

In Fig. 4 I have also shown the ring or band 10 provided with an inwardly-directed projection 12, which is formed after the nut has been screwed home by striking the said ring or band with a suitable instrument, the object of this projection being to prevent the nut from turning, which object is accomplished by reason of the corner of the nut coming in contact with said projection if at any time the nut should turn or become loose on the bolt. This device is used wherever nut-locks are necessary, and by means thereof the nut is securely held in position and will not work loose by the jolting or jarring to which the parts may be subjected.

Having fully described my invention, I claim as new and desire to secure by Letters Patent—

A nut-lock, comprising a flexible ring or band having inwardly-directed radial arms, the inner ends of which terminate in a circle of less diameter than the bolt, said inner ends being also provided with sharp points, and being directed outwardly when the bolt is passed therethrough and a nut which is adapted to be screwed onto said bolt, and which is of less diameter than said ring or band, said flexible ring or band furnishing means to prevent the turning of said nut after said nut is screwed home, said means consisting of an inwardly-bent portion of said flexible ring or band, said bent portion being formed after said nut is screwed home, substantially as shown and described.

In testimony that I claim the foregoing as my invention I have signed my name, in presence of the subscribing witnesses, this 20th day of June, 1898.

RICHARD WILLIAM JAMIESON.

Witnesses:
EDMUND M. WASMUTH,
A. M. BROWN.